(12) United States Patent
Katou

(10) Patent No.: US 7,237,997 B2
(45) Date of Patent: Jul. 3, 2007

(54) FIXING TOOL

(75) Inventor: Katsuhisa Katou, Inazawa (JP)

(73) Assignee: Aoyama Seisakusho Co., Ltd., Nagoya (JP)

( * ) Notice: Subject to any disclaimer, the term of this patent is extended or adjusted under 35 U.S.C. 154(b) by 280 days.

(21) Appl. No.: 10/969,785

(22) Filed: Oct. 20, 2004

(65) Prior Publication Data

US 2005/0097992 A1 May 12, 2005

(30) Foreign Application Priority Data

Nov. 10, 2003 (JP) ............................... 2003-379890

(51) Int. Cl.
*F16B 23/00* (2006.01)
(52) U.S. Cl. .................... 411/396; 411/377; 411/409
(58) Field of Classification Search ................ 411/396, 411/409, 431, 377, 373, 389, 372.5, 372.6
See application file for complete search history.

(56) References Cited

U.S. PATENT DOCUMENTS 2,827,973 A * 3/1958 Coleman ................... 180/68.5
4,413,374 A * 11/1983 Ferdinand et al. ............ 16/441
4,793,319 A * 12/1988 Vaughan et al. ........... 124/25.6
4,907,927 A * 3/1990 Choiniere .................... 411/368
5,067,750 A * 11/1991 Minneman .................... 285/38
5,226,769 A * 7/1993 Negre et al. ................ 411/354
5,480,273 A * 1/1996 Jou ............................. 411/373
5,669,592 A * 9/1997 Kearful .................... 248/217.4

FOREIGN PATENT DOCUMENTS

JP            6-083577        11/1994

* cited by examiner

*Primary Examiner*—Flemming Saether
(74) *Attorney, Agent, or Firm*—Burr & Brown

(57) ABSTRACT

A fixing tool for fixing an object to be fixed against an opponent member upon pinioning includes a male screw member screwed into a female screw portion formed on the opponent member side and a pinion member for pinioning the object to be fixed in the opponent direction. The male screw member includes a first axis portion formed with a male screw and a head portion having a non-circular contour formed at an upper end of the first axis portion. The pinion member includes a through hole into which the first axis portion of the male screw portion is inserted, seat portions that are formed inside of the through hole at which the head portion of the male screw member is seated, and engaging portions that pinch the head portion between the seat portions for engaging the head portion in a detachable manner.

5 Claims, 3 Drawing Sheets

FIXING TOOL

This application claims the benefit of Japanese Application No. 2003-379890, filed Nov. 10, 2003, the entirety of which is incorporated herein by reference.

FIELD OF THE INVENTION

The present invention relates to a fixing tool that is mounted to an opponent member through screw tightening for fixing an object to be fixed to the opponent member upon pinioning.

BACKGROUND OF THE INVENTION

Various fixing tools are conventionally known that are mounted to a vehicle body of an automobile or the like through screw tightening for fixing an object to be fixed to the vehicle body through pinioning. For example, there is known a fixing tool that is mounted to an underfloor portion of a luggage compartment of an automobile for fixing a spare tire to the vehicle body of the automobile by means of a screw so that the tire is pinioned to the vehicle body. Such a fixing tool is generally comprised of a pinion member for pinioning the tire in the vehicle body direction and a bolt to which the pinion member is integrally mounted and that is screwed into a female screw portion formed at the vehicle body. Japanese Utility Model Laid-Open Publication No. 6-83577(1994) suggests a bolt for holding a spare tire in which an axis portion of the bolt and a head portion that concurrently serves as a tab when screwing-in the bolt are integrally formed. According to this bolt for holding a spare tire with the above structure, it is possible to reduce the number of components and to simplify manufacturing processes since it will not be necessary to fit a washer or the like into the axis portion of the bolt.

However, since the above prior art is arranged in that the bolt and the pinion member, which are made of different materials, are integrally formed, it will be necessary to separate both members for reuse upon recycling, and a drawback is presented in that the recycling efficiency is degraded.

The present invention has been made for solving the above subjects, and it is an object thereof to provide a fixing tool that exhibits superior recycling efficiency and that is capable of reliably fixing an object to be fixed to an opponent member.

SUMMARY OF THE INVENTION

The fixing tool according to the present invention that has been made for achieving the above objects is a fixing tool that is mounted to an opponent member through screw tightening for fixing an object to be fixed against the opponent member upon pinioning. The fixing tool includes a male screw member that is screwed into a female screw portion formed at the opponent side, and a pinion member that abuts the object to be fixed for pinioning the object to be fixed in the opponent direction. The male screw member includes a first axis portion formed with a male screw and a head portion having a non-circular contour formed at an upper end of the first axis portion. The pinion member includes a through hole into which the first axis portion of the male screw member is inserted, seat portions that are formed inside of the through hole at which a head portion of the male screw member is seated, and engaging portions that pinch the head portion between themselves and the seat portion for engaging the same in a freely detachable manner.

In this respect, the through hole is preferably arranged such that a portion between the seat portions and the engaging portions is formed to have a shape that is substantially identical to that of the head portion when seen in a plan view. It is further possible to provide a second axis portion including a male screw to extend from the head portion of the male screw member in a direction opposite to that of the first axis portion. The pinion member is preferably formed with a torque transmitting portion for transmitting torque to the male screw member. According to a preferred embodiment, the object to the fixed is a spare tire and the opponent member is a vehicle body, and the fixing tool of the present invention is employed for fixing the spare tire to the vehicle body by screwing the male screw member into a female screw portion formed at a spare tire accumulating portion of the vehicle body to thus pinion a wheel of the spare tire in the accumulating portion direction by means of the pinion member.

The fixing tool according to the present invention is arranged in that the male screw member that is screwed into the female screw portion formed at the opponent side and the pinion member for pinioning the object to be fixed in the opponent direction can be engaged in a freely detachable manner. Since both members, which are integrally assembled at the time of use, can be easily separated for reliably separating respective members comprised of different materials, it is possible to improve the recycling efficiency after using the fixing tool. By forming the torque transmitting portion, which transmits torque to the male screw member, at the pinion member, it is possible to easily transmit torque to the male screw member by means of the pinion member.

When a portion between the seat portions of the through hole located between engaging portions is formed to have a shape that is substantially identical to that of the head portion of the bolt, which is the male screw member, when seen in a planar view, it will be possible to prevent rotation of the bolt head portion within the through hole so that torque may be efficiently and reliably transmitted. By further providing a second axis portion having a shape of a male screw to extend in a direction opposite to that of the first axis portion that extends from the head portion of the male screw member, it will be possible to provide a lid member or similar to cover such that the second axis portion projects in a condition in which the object to be fixed is fixed against the opponent. With this arrangement, it will be possible to prevent foreign matters or the like from entering the accumulating portion of the object to be fixed and to effectively utilize a space above a position at which the object to be fixed is disposed and thus to improve the appearance thereof.

The fixing tool according to the present invention can suitably be employed, when the object to be fixed is a spare tire, for fixing a spare tire by screwing a male screw member into a female screw portion formed at a spare tire accumulating portion of a vehicle body to pinion a wheel of the spare tire by a pinion member in the accumulating portion direction.

DETAILED DESCRIPTION OF THE INVENTION

One embodiment of a fixing tool that illustrates the present invention will now be explained with reference to the drawings. While explanations of the present embodiment refer to a fixing tool that is used for fixing a spare tire, which comprises an object to be fixed, to a vehicle, which comprises an opponent, it goes without saying that the present invention is not limited to such an embodiment.

Figure 1:
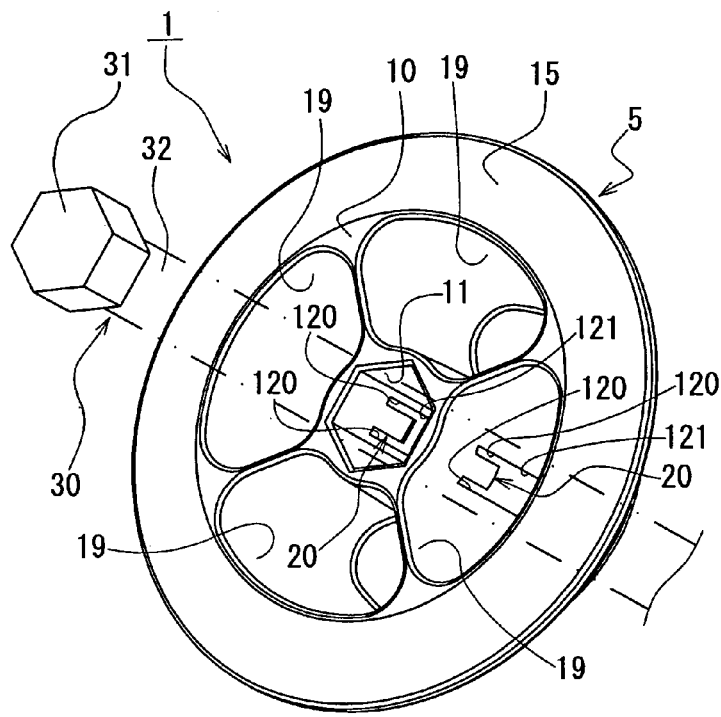
FIG. 1 is a perspective view of the fixing tool according to the present invention.
Figure 3:
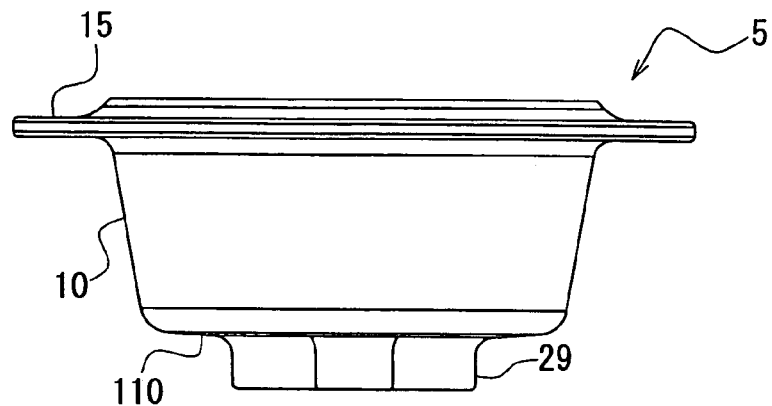
FIG. 3 is a side view of the pinion member shown in FIG. 2.

As illustrated in FIGS. 1 and 3, the fixing tool 1 of the present embodiment has a shape of an inversed circular truncated cone as a whole, and is comprised of a pinion member 5 integrally formed using a synthetic resin and a bolt 30, which is a male screw member for mounting the pinion member 5 to the vehicle body. In this respect, the bolt 30 comprising the fixing tool 1 of the present embodiment is a commonly used one comprised of a head portion 31 having an orthohexagonal contour and an axis portion 32 including a male screw (not shown).

Figure 2:
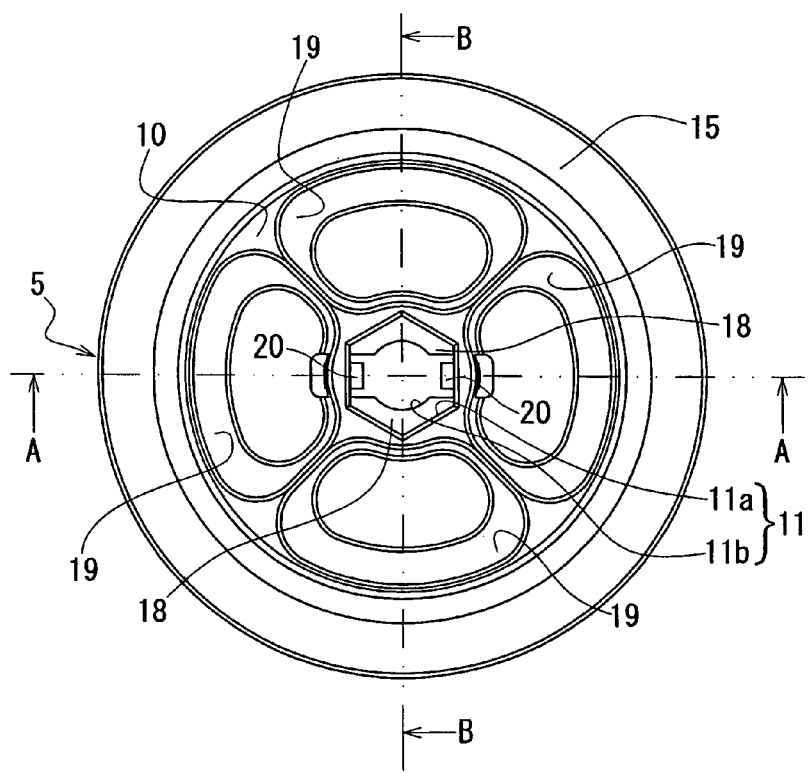
FIG. 2 is a plan view of a pinion member in accordance with the present invention.

As illustrated in FIGS. 2 and 3, the pinion member 5 has a shape of an inversed circular truncated cone, and is comprised with a bolt holding portion 10 for engaging with and holding the head portion 31 of the bolt 30 (see FIG. 1) and an annular flange 15 that is provided to project from an outer periphery of a top portion (large diameter portion of the circular truncated cone) of the bolt holding portion 10 towards a direction that is orthogonal to the central axis of the bolt holding portion 10. Here, since the bolt holding portion 10 has a shape of an inversed circular truncated cone, it is defined in the pinion member 5 of the present embodiment that the large diameter portion side, which originally comprises a bottom portion of the circular truncated cone, is a top portion side, while a small diameter portion side thereof is defined to be a bottom portion side. A through hole 11 into which the bolt 30 is inserted is formed at the central axis of the bolt holding portion 10. This through hole 11 comprises a hexagonal portion 11a, which has an orthohexagonal shape when seen in a planar view, formed at the top portion side of the bolt holding portion 10 (frontward side in FIG. 2 and upper side in FIG. 3) and a circular portion 11b, which has a substantially circular shape when seen in a planar view and which is of a smaller diameter than the hexagonal portion 11a, formed at the bottom portion side of the bolt holding portion 10 (depth side in FIG. 2 and lower side in FIG. 3), wherein stepped portions 18 are formed between the hexagonal portion 11a and the circular portion 11b to be orthogonal to the central axial direction of the bolt holding portion 10. In this respect, the hexagonal portion 11a has a shape that is substantially identical to that of the head portion 31 of the bolt 30 when seen in a planar view. A tubular rib 29 that is of an even smaller diameter and of a short length is provided to project from a bottom portion side surface 110 of the bolt holding portion 10 to be concentric with the bolt holding portion 10. Although not illustrated in detail, tubular rib 29 has a cylindrical shape having an elliptic shape when seen from the bottom side, and its inner peripheral portion communicates with the circular portion 11b of the through hole 11.

Figure 4:
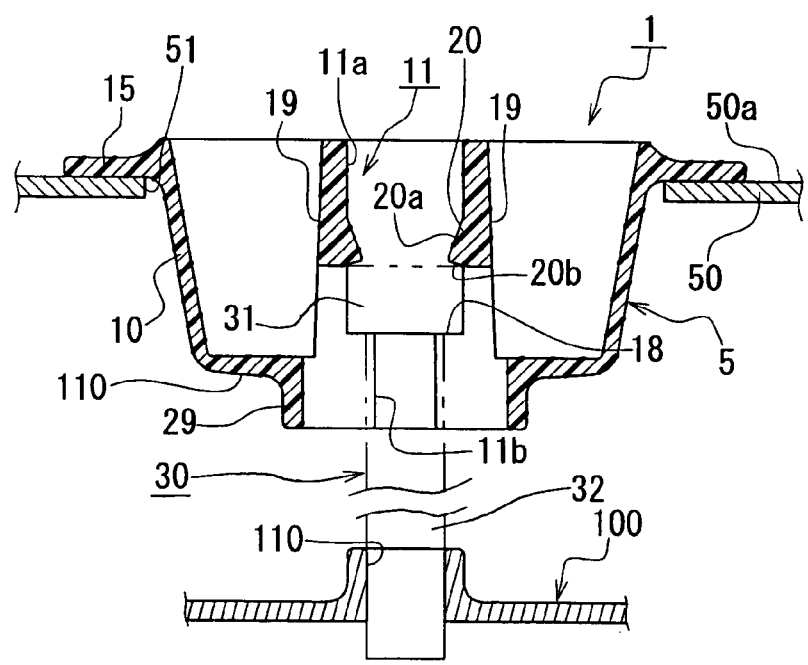
FIG. 4 is a sectional view as seen from A-A in FIG. 2.

The configuration of the through hole 11 will now be explained in detail with reference to FIGS. 1, 2 and 4. As illustrated in FIGS. 2 and 4, the hexagonal portion 11a and the circular portion 11b are formed within the through hole 11. The hexagonal portion 11a is formed to extend substantially two-thirds of the entire height of the bolt holding portion 10, including the rib 29, from the tip portion side to the bottom portion side, and the circular portion 11b extends therefrom with the stepped portions 18 between up to an end portion of the bottom portion side. Engaging claws 20 for engaging the head portion 31 of the bolt 30 when it is seated at the stepped portions 18 are provided to project inward from one pair of opposing two surfaces out of six inner surfaces comprising the hexagonal portion 11a. As illustrated in FIG. 1, the engaging claws 20 are formed at the one pair of opposing two surfaces to have a specified width, and slits 120 for applying flexibility to the engaging claws 20 are formed at edge portions on the right and left sides thereof. Substantially rectangular through holes 121 are provided to continue from the slits 120 to the bottom portion side of the bolt holding portion 10, and the through holes 121 communicate to dent portions 19 formed to surround the periphery of the through hole 11 at the bolt holding portion 10. The dent portions 19 will be explained in detail below.

As illustrated in FIGS. 1 and 4, each engaging claw 20 has a substantially rectangular shape when seen from the front and a substantially triangular shape when seen from the side, wherein an inserting surface 20a, which is a surface on a side into which the bolt 30 is inserted, is formed at the top portion side of the bolt holding portion 10 and an engaging surface for engaging the head portion 31 of the inserted bolt 30 is formed at the bottom portion side of the bolt holding portion 10, respectively at specified angles with respect to the central axis of the bolt holding portion 10. An angle that is formed between the inserting surface 20a and a direction that is parallel to the stepped portions 18 (horizontal direction) is defined to be larger than an angle that is formed between the engaging surface 20b and this horizontal direction. With this arrangement, insertion can be easily performed when inserting the bolt 30 since the repulsion is small when the inserting surface 20a is pushed by the head portion 31 of the bolt 30, and since the head portion 31 and the engaging surface 20b reliably engage with each other after insertion of the bolt 30, it is possible to reliably prevent dropout of the bolt 30 that is in engagement between the engaging claws 20 and the stepped portions 18.

As illustrated in FIG. 2, the stepped portions 18 are formed to pinch the pair of engaging claws when seen in a planar view, with the engaging claws 20 respectively projecting from one pair of opposing surfaces of the hexagonal portion 11a. In other words, the stepped portions 18 are not formed downward of the engaging claws 20 (depth direction in the drawing) but they are formed to oppose in a direction that is orthogonal to the opposing direction of the engaging claws 20. More particularly, the stepped portions 18 are formed in a two-split manner at portions downward of the engaging claws 20 except for a region in which a specified width including both of the width of the engaging claws 20 and the width of the slits 120 formed at edge portions on right and left sides thereof is elongated in the opposing direction of the engaging claws 20. The stepped portions 18 are further arranged in that their edges in the central axial side of the bolt holding portion 10 are notched in an arc-like shape, and by elongating the arc-like notches from the stepped portions 18 in the bottom portion direction of the bolt holding portion 10, the circular portion 11*b* is formed and is a substantially circular through hole when seen in a planar view.

Four dent portions 19 that are substantially elliptic when seen in a planar view are formed to surround the periphery of the through hole 11 of the bolt holding portion 10. The dent portions 19 are formed such that there are two opposing pairs in the opposing direction of the engaging claws 20 and the opposing direction of the stepped portions 18. The dent portions 19 are shaped such that they are dented with a slight reduction in diameter from aperture portions formed at the top portion side of the bolt holding portion 10 towards the bottom portion side. The dent portions 19 are formed to have a size into which a person can insert his or her fingers therein so that an operator using the fixing tool can hook his or her fingers at the dent portions 19 for rotating the pinion member 5 when mounting the fixing tool 1. With this arrangement, the operator can easily screw the bolt 30 into the female screw portion formed at the vehicle body.

Figure 5:
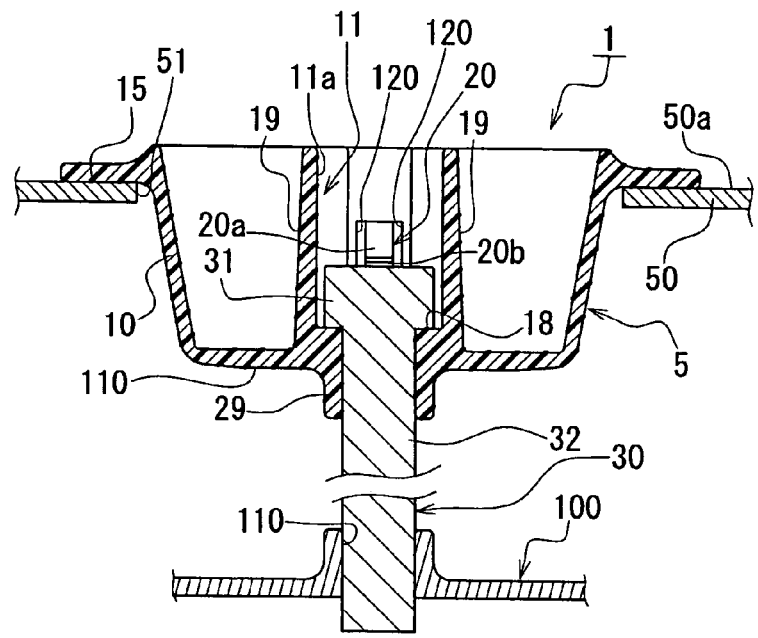
FIG. 5 is a sectional view as seen from B-B in FIG. 2.

A form for using the fixing tool 1 of the present embodiment will now be explained with reference to FIGS. 4 and 5.

When using the fixing tool 1, the bolt 30 is inserted into the through hole 11 provided at the bolt holding portion 10 of the pinion member 5 for integrally assembling the pinion member 5 and the bolt 30. The axis portion 32 of the bolt 30 is inserted into the through hole 11 from the top portion of the bolt holding portion 10 towards the bottom portion direction, and when the head portion 31 has passed between the engaging claws 20, it abuts (seats) against the stepped portions 18 formed within the through holes 11, and the bolt is integrally assembled with the pinion member 5 in a condition in which the head portion 31 is engaged between the stepped portions 18 and the engaging claws 20. This fixing tool 1 is then opposed to a hub hole 51 of a wheel 50 of a spare tire (not shown) accumulated in a spare tire accumulating portion 100 of the vehicle with the axis portion 32 side of the bolt 30 facing frontward.

A female screw portion 110 is formed at a position of the spare tire accumulating portion 100 opposing the fixing tool 1 with the wheel 50 between, and by screwing a male screw (not shown) formed at the axis portion 32 of the bolt 30 into this female screw portion 110, the fixing tool 1 moves downward in its entirely, and a flange 15 formed at the bolt holding portion 10 of the pinion member 5 will finally abut a wheel upper surface 50*a* at a peripheral edge of the hub hole 51. Here, the operator mounting the fixing tool 1 to the vehicle body can easily rotate the pinion member 5 and the bolt 30 in the screwing direction by hooking his or her fingers at the dent portion 19 of the bolt holding portion 10. The wheel 50 will be pinioned by the fixing tool 1 from above in a downward direction in a condition in which the flange 15 formed at the bolt holding portion 10 abuts against the wheel upper surface 50*a* at the peripheral edge of the hub hole 51 to thus fix the spare tire against the vehicle body.

The fixing tool 1 can be easily detached from the spare tire accumulating portion 100 by rotating the pinion member 5 in a direction opposite to the screwing direction, and by flexing the engaging claws 20 outward, the pinion member 5 and the bolt 30 can be easily separated. Accordingly, there will be no problems in separating the pinion member 5 and the bolt 30 when recycling the fixing tool 1, and both members comprised of different materials can be reliably separated. In addition thereto, when using the fixing tool 1, the bolt 30 is engaged by the engaging claws 20 and seated at the stepped portions 18 and the hexagonal head portion 31 will be fitted against the hexagonal portion 11*a* of the through hole 11 that has a similar hexagonal shape when seen in a planar view, the head 31 and the bolt 30 will not rotate within the through hole 11.

In this respect, various modifications of the present invention other than the above embodiment are possible. For instance, according to the present embodiment, the fixing tool has been used for fixing a spare tire to a vehicle body, but the fixing tool according to the present invention can of course be favorably employed when using other objects to be fixed such as a jack with respect to the vehicle body. While the through hole of the bolt holding portion has been formed to be of a hexagonal shape, when seen in a planar view, to meet the shape of the bolt head portion, the shape of the through hole is not limited to this unless it is a non-circular shape with which the bolt does not rotate within the hole. Nor is the shape and the number of the engaging claws limited to those as illustrated in the present embodiment. It is also possible to change the shape of the bolt so as to cover the spare tire fixed to the vehicle body from above by a lid member. A modified example of the bolt configuration will now be explained with reference to FIG. 6.

Figure 6:
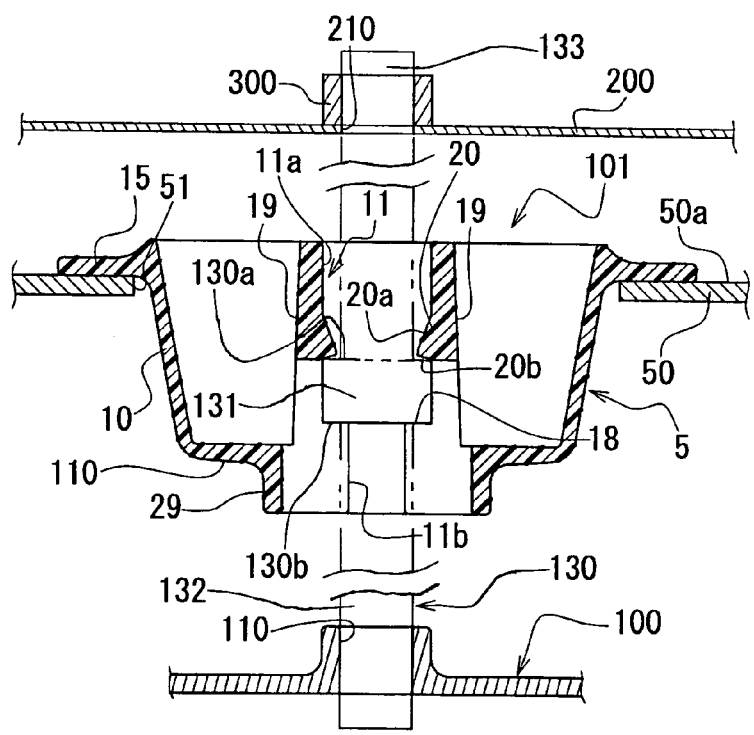
FIG. 6 is a sectional view illustrating a modified example of the present invention.

As illustrated in FIG. 6, a fixing tool 101 comprises a pinion member 5 similar to that of the afore-mentioned embodiment, and it is comprised of the pinion member 5 and a bolt 130 in which two axis portions 132, 133 (first axis portion 132 and second axis portion 133) respectively extend upward and downward from upper and lower side surfaces 130*a*, 130*b* of a head portion 131 having an orthohexagonal contour. Fixing of the spare tire to the vehicle body can be similarly performed as when using the fixing tool 1 of the afore-mentioned embodiment by integrally assembling the bolt 130 to the pinion member 5 and screwing the first axis portion 132 extending downward from the head portion 131 of the bolt 130 to a female screw portion 110 of a spare tire accumulating portion 100 of the vehicle body.

After fixing the spare tire, a lid member 200 is provided to cover the fixing tool 101 from above such that the second axis portion 133 extending upward from the head portion 131 of the bolt 130 pierces through a through hole 210 provided at the lid member 200. Here, a surface area of the lid member 200 is deemed to be larger than an aperture (not shown) of the spare tire accumulating portion 100 while portions of the lid portion 200 running over from the aperture are deemed to abut a floor portion of the vehicle. When a nut 300 is screwed into the second axis portion 133 projecting from the lid member 200, it is possible to fix the lid member 200 to the vehicle body. Accordingly, by using the bolt 130, it will be possible to prevent foreign matters from entering the spare tire accumulating portion 100 and to prevent foreign matters from adhering to the spare tire itself, and it will further be possible to improve the external appearance thereof.

What is claimed:

1. A fixing tool mounted to an opponent member through screw tightening for fixing an object to be fixed against the opponent member upon pinioning, the fixing tool comprising:

a male screw member screwed into a female screw portion formed at the opponent member side; and a pinion member abutting the object to be fixed for pinioning the object to be fixed in the opponent member direction, wherein the male screw member comprises a first axis portion formed with a male screw and a head portion having a non-circular contour formed at an upper end of the first axis portion, and wherein the pinion member comprises a through hole into which the first axis portion of the male screw portion is inserted, seat portions formed inside of the through hole at which the head portion of the male screw member is seated, and engaging portions pinching the head portion between the engaging portions and the seat portions in a freely detachable manner, each of the engaging portions being separated from the pinion member along three edge portions of each engaging portion by slits passing through a portion of the pinion member.

2. The fixing tool as claimed in claim 1, wherein the through hole is arranged such that a portion between the seat portions and engaging portions is formed to have a shape that is substantially identical to that of the head portion when seen in a planar view.

3. The fixing tool as claimed in claim 1, wherein a second axis portion including a male screw is provided to extend from the head portion of the male screw member in a direction opposite to that of the first axis portion.

4. The fixing tool as claimed in claim 1, wherein a torque transmitting portion for transmitting torque to the male screw portion is formed at the pinion member.

5. The fixing tool as claimed in claim 1, wherein the pinion member is sized to pass through a hub hole of a spare tire, and wherein the male screw member is sized to mate with a female screw portion formed at a spare tire accumulating portion of a vehicle body to thus pinion a wheel of the spare tire in the accumulating portion direction by means of the pinion member.

* * * * *